UNITED STATES PATENT OFFICE.

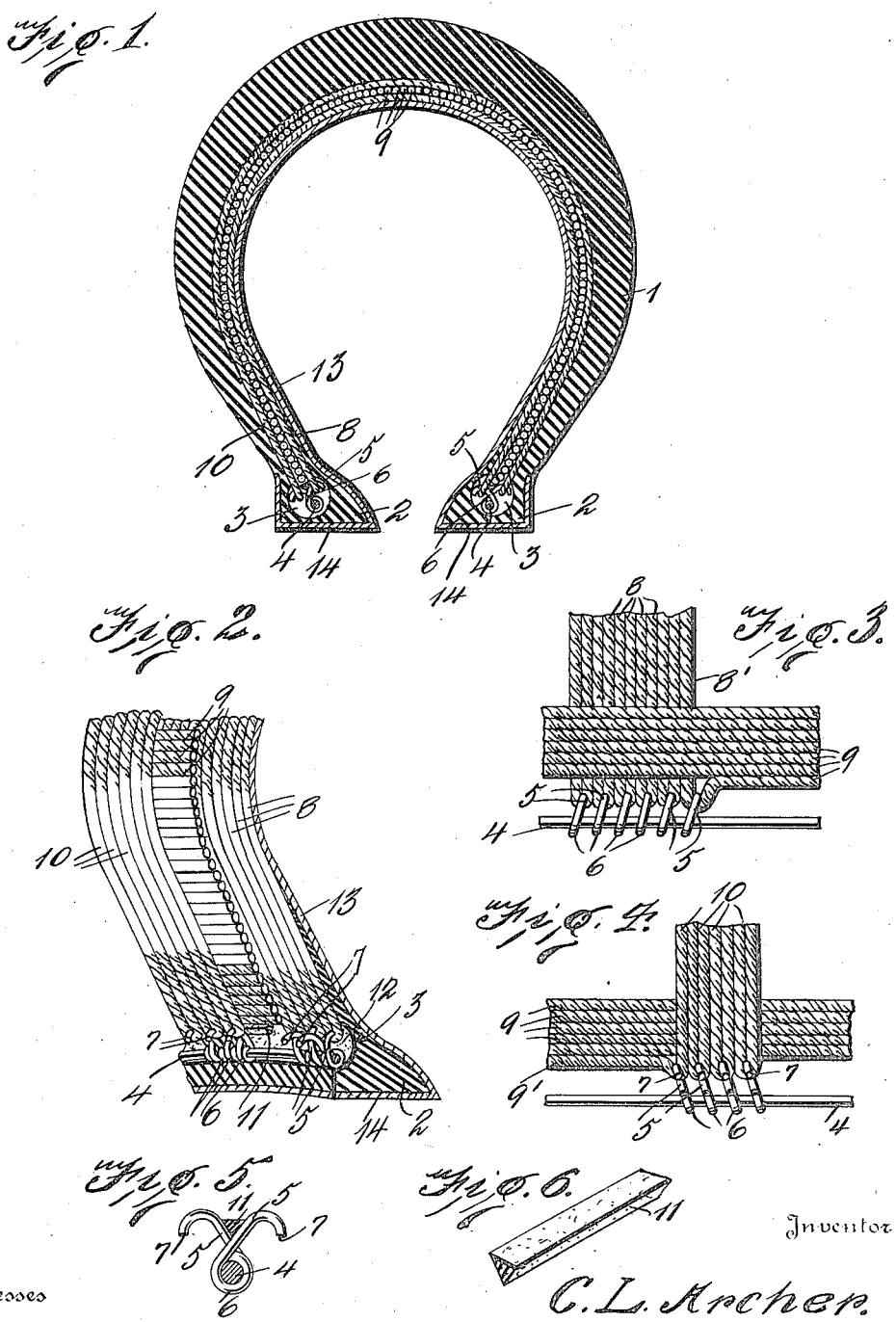

CHARLES L. ARCHER, OF COUNCIL BLUFFS, IOWA.

PNEUMATIC TIRE.

1,170,597. Specification of Letters Patent. Patented Feb. 8, 1916.

Application filed May 10, 1915. Serial No. 27,172.

*To all whom it may concern:*

Be it known that I, CHARLES L. ARCHER, a citizen of the United States of America, residing at Council Bluffs, in the county of Pottawattamie and State of Iowa, have invented certain new and useful Improvements in Pneumatic Tires, of which the following is a specification, reference being had therein to the accompanying drawing.

This invention relates to a pneumatic tire and has for its principal object the production of a simple and efficient means for reinforcing the outer casing, thereby protecting the inner tube.

Another object of this invention is the production of a reinforcing rubberized cord which is passed so as to form three complete layers, all being formed of one continual cord, for positively reinforcing the outer casing.

Another object of this invention is the production of a pneumatic tire wherein the outer casing is provided with a plurality of hooks around which the reinforcing cord is adapted to be passed for positively retaining the cord in its correct position within the inner portions of the outer casing.

Another object of this invention is the production of a simple and efficient means for yieldably retaining the hooks in their correct positions, whereby the cord may be passed therearound without danger of its accidental displacement, this means being adapted to allow the hooks to slightly move under an excessive pressure, thereby evenly distributing the strain to the several portions of the tire when the same is in use.

With these and other objects in view, this invention consists of certain novel combinations, constructions, and arrangements of parts as will be hereinafter fully described and claimed.

In the accompanying drawing:—Figure 1 is a transverse section through a pneumatic tire casing, constructed in accordance with this invention, the rubber filling members thereof being removed. Fig. 2 is a fragmentary sectional perspective view of the device, illustrating the manner in which the rubberized cord is passed so as to form the several layers thereof. Fig. 3 is an elevation of a portion of the cord, independent of the tire casing, illustrating how the transverse cords pass and finally extend to form the longitudinal cords which form the intermediate layer. Fig. 4 is a plan view of a portion of the cord, showing a figure somewhat similar to Fig. 3 and illustrating the manner in which the longitudinal portions of the cord finally terminate so as to pass around the outer hooks to form the outer transverse layer. Fig. 5 is a side elevation of a plurality of the hooks, illustrating how the same are supported and retained in their correct positions so that their free ends will extend in opposite directions. Fig. 6 is a fragmentary detailed perspective view of the yieldable rubber wedge.

Referring to the accompanying drawing by numerals it will be seen that the outer casing 1 is provided with heels 2 within which the longitudinal bores 3 are formed. A reinforcing member for the outer casing 1 is carried upon the inner portions thereof. This reinforcement is formed from a single strand of rubberized cord and therefore after the device has been assembled there has not been produced knots or other uneven surfaces which will cause undue wear at any particular portion. The supporting elements for the rubberized cord comprise a cable 4 which may be formed of any suitable metal, such for instance as piano wire, one of these cables 4 extending throughout the entire length of each bore 3, and being positioned therein. The hooks 5 have eyes 6 coiled upon one end thereof and through these eyes 6 the cable 4 is adapted to extend for the purpose of supporting the hooks 5. The opposite ends of the hooks 5 are bent as shown at 7 for the purpose of receiving the rubberized cord. These hooks when placed upon the cables 4 are positioned in alternate relations to each other so that the hooked ends of one hook 5 will extend in opposite directions to the adjacent hooks. Since the cables 4 extend through the bores 3 the hooks 5 will also be carried within the bores. The rubberized cord is first passed transversely back and forth around the inner portions of the tire casing 1 as shown at 8. These transversely extending portions will extend entirely around the entire longitudinal circumference of the tire casing 1 until the last transversely extending portion will meet the first transversely extending portion, at which time the last transversely extending portion represented at 8′ in Fig. 3 will be passed over the hook and then turned in a longitudinal direction so as to form the longitudinally extending portions 9 formed by the passing of the portions 9 in longitudinal directions throughout the entire longitudinal circumference of the tire casing 1 until their longitudinal winding will cause the longitudinal portions 9 to extend entirely around the transverse portions of the casing 1 as shown clearly in Fig. 1 so as to extend to the opposite side of the tire casing 1 and adjacent the hooks carried by the opposite cable 4 from the hooks and cable where was begun the winding or passing operation. At this time, the hooks which extend in one direction, will be engaged by the first-mentioned transversely extending portions 8 of the rubberized cord while the hooks extending in the opposite directions will be free. As soon as the longitudinal portions of the cord have been passed entirely around the transverse inner circumference of the tire by extending in longitudinal directions so as to be positioned adjacent the remaining free hooks, the last longitudinal portion 9' may be passed around one of the remaining free hooks and then turned in a direction at right angles to the longitudinal portions 9 and in the same direction as the transverse portions 8. The cords are then passed back and forth engaging first one of the hooks or one side of the tire casing and then being passed around or engaging one of the hooks upon the opposite side of the tire casing. This operation is continued until the last-mentioned transversely extending portions will form a complete layer throughout the entire longitudinal circumference of the tire casing 1 although extending transversely relative thereto. It is of course obvious that after the outer transversely extending portions 10 have been passed so that a complete layer is finally formed, the free end of the cord may be secured to the free end of the first transverse portions 8 or these ends may be secured to any portion within the tire which may be thought best for positively securing the free ends against accidental displacement. At this time it will be seen that the transverse portions of the cord, as shown at 8, will extend in the same direction and parallel to the transverse portions 10 thereof and that between the spaces of these parallel portions, the longitudinal portions 9 are interposed so as to form three complete thicknesses or layers of reinforcements. By the winding or passing of the cords around the hooks, as hereinbefore set forth, the reinforcement is so constructed as to eliminate the knots or other objectionable elements as well as the undesired actions attending thereto.

Before the cord has been completely wound so as to form the three independent layers, the rubber wedge 11 which is triangular in cross-section is passed through each of the bores 3 so as to be wedged between the hooks as clearly shown in Fig. 5 for positively retaining the hooks in their alternate relations. In this manner, it will be impossible for the hooks to swing so as to allow the portions of the cord passing thereover to be accidentally displaced by the slipping from the hooked portions 7 of the hooks 5 or from the wearing of the hooks against each other and the consequent cutting or wearing of the cord which would cause the same to break. It of course is obvious however that the rubber wedge 11 will retain the hooks in their correct positions, which is of such yieldable material as will allow the hooks to move slightly when undue or excessive pressure is brought to bear upon any one or several adjacent hooks by reason of the pressure exerted upon the cord of the layers hereinbefore set forth, thus imparting an even pull to a great number of the hooks whereby the accidental injury to any particular portion of the device is prevented. After this rubber wedge has been placed in position, the bores 3 are adapted to be filled with a rubber packing 12 as shown in Fig. 2, this rubber packing 12 being formed of very soft rubber or light packing material thereby allowing the hooks to swing slightly when excessive pressure is brought to bear thereon and at the same time constitute an efficient means for retaining the rubber wedge in its correct position within the bore 3 and at the same time prevent the sagging of the several portions carried within the bores.

It must be borne in mind that owing to the direction in which the several layers have been passed or formed, the transverse portions and longitudinal portions of the rubberized cord will extend at right angles to each other so as to extend either transversely or longitudinally within the inner tube casing 1.

After the device has been assembled as hereinbefore set forth, the layer 13 of antifriction rubber may be passed within the inner portions of the casing 1 so as to engage the transverse portions 8 of the reinforcement. This layer 13 has its outer portions 14 extending around the heels 2 of the casing 1 whereby when the device has been positioned upon the felly of a wheel, this layer of rubber will be efficiently retained in position so that when the inner tube is carried therein, wear thereon will be reduced to a minimum, owing to the fact that the smooth inner surface will prevent undue wear upon any portion of the inner tube.

From the foregoing description it will be seen that a very simple and efficient reinforcement has been produced for the outer casing of a pneumatic tire, wherein several independent layers have been produced, being formed from one continual strand of rubberized cord, wherein a simple and efficient means has been provided for engaging the several portions of the cord for efficiently and positively retaining the same in their correct positions after the assembling thereof.

What I claim is:—

1. A device of the class described, comprising a plurality of reinforcing layers, said layers being formed of a single strand of rubberized cord, the outer and inner layers extending in the opposite directions to the central layer, said layers being adapted to be positioned within the tire casing for reinforcing the same.

2. A device of the class described comprising inner and outer layers, a central layer interposed between said inner and outer layers, said central layer extending at right angles to said inner and outer layers, said layers being formed of a single strand of material, said layers being adapted to be positioned within a tire casing for reinforcing the same.

3. In a device of the class described, the combination of a tire casing having heel portions, longitudinal bores formed within said heel portions, a single strand of rubberized cord extending transversely back and forth around the inner portions of said casing and then passing longitudinally so as to form independent layers, said longitudinal portion terminating in an outer transversely extending portion forming an outer layer, said outer layer extending at right angles to the longitudinal layer, and means carried within said bores for engaging said layers and positively retaining the same in their correct positions.

4. In a device of the class described, the combination of a plurality of supporting cables, hooks carried upon said cables, a single strand of rubberized cord passing transversely backward and forward and being secured to said hooks, thereby forming an inner layer, said cord then extending to form longitudinal portions, thereby forming an intermediate longitudinal layer, said longitudinal portions then terminating in transversely extending portions forming an outer transverse layer, said outer transverse layer being secured to said hooks, whereby three independent layers will be formed in which the outer and inner transverse layers will be formed so as to extend at right angles to the longitudinally extending layers, said layers, hooks, and cable being adapted to be positioned within a tire casing for reinforcing the same.

5. In a device of the class described, the combination of a plurality of cables, hooks carried upon said cables, said hooks having hooked ends extending in opposite directions, a rubberized cord passing around said hooks and extending to form reinforcing layers, and means fitting between said hooks for holding the same in their correct extended positions whereby the hooks will be prevented from accidentally swinging to closed positions causing the displacement of the cords, said cables, hooks, and layers being adapted to be positioned within the inner portions of a tire casing, for reinforcing the same.

6. In a device of the class described, the combination of a tire casing having a plurality of longitudinal bores, cables carried within said bores, hooks carried upon said cables, said hooks having hooked ends extending in opposite directions, a rubberized cord passing around said hooks, an inner transversely extending layer formed by passing the cord around a plurality of said hooked ends, said inner transversely extending layer terminating in longitudinally extending portions forming an intermediate layer, said longitudinal layer terminating in an outer transversely extending layer, said last-mentioned layer being passed around the remaining hooked ends, said intermediate layer extending at right angles to the first-mentioned and last-mentioned layers, a rubber wedge positioned within each of said bores and fitting between the hooked ends so as to hold the same in their correct extended positions, filler means carried within each of said bores for holding each wedge in engagement with the hooks and preventing the sagging of the cables or hooks, said hooks being adapted to yield slightly when undue pressure is brought to bear upon some portion of the casing, whereby the strain will be evenly distributed throughout the entire device.

In testimony whereof I hereunto affix my signature in presence of two witnesses.

CHARLES L. ARCHER.

Witnesses:
GEO. S. WRIGHT,
RAILY V. EHLE.

Copies of this patent may be obtained for five cents each, by addressing the "Commissioner of Patents, Washington, D. C."